United States Patent

[11] 3,623,102

[72] Inventor George M. Holley, Jr.
510 Sheldon Road, Grosse Pointe, Mich. 48236
[21] Appl. No. 889,080
[22] Filed Dec. 30, 1969
[45] Patented Nov. 23, 1971
Continuation-in-part of application Ser. No. 730,204, May 17, 1968, now Patent No. 3,524,187, Continuation-in-part of application Ser. No. 872,060, Oct. 29, 1969.

[54] POSITION PLOTTER
7 Claims, 13 Drawing Figs.
[52] U.S. Cl. .................................................. 343/112 PT, 343/117 R
[51] Int. Cl. .................................................. G01s 5/08
[50] Field of Search .......................................... 343/112 PT, 117

[56] References Cited
UNITED STATES PATENTS
2,080,511 5/1937 Sjostrand ..................... 343/112 PT UX
2,307,029 1/1943 Elm ............................. 343/112 PT UX
2,462,077 2/1949 Duggar ........................ 343/112 PT Primary Examiner—Rodney D. Bennett, Jr.
Assistant Examiner—Richard E. Berger
Attorney—Burton and Parker ABSTRACT: This disclosure relates to an automatic position plotter having particular utility for marine vessel navigation applications and which will give a visual plot in relation to a navigational chart during movement of the vessel. The plotter includes a rotatable platform carrying according to one embodiment of the invention a chart image projector and two reticle position projectors with the platform and the reticle projectors controlled by radio directional control apparatus that automatically maintains the projected images in proper orientation during movements of the vessel to provide a continuous plot of position. If desired the platform may be rotated manually to provide a semicontinuous or semiautomatic position plotter, and further the reticle projectors may be replaced by mechanical pointer devices.

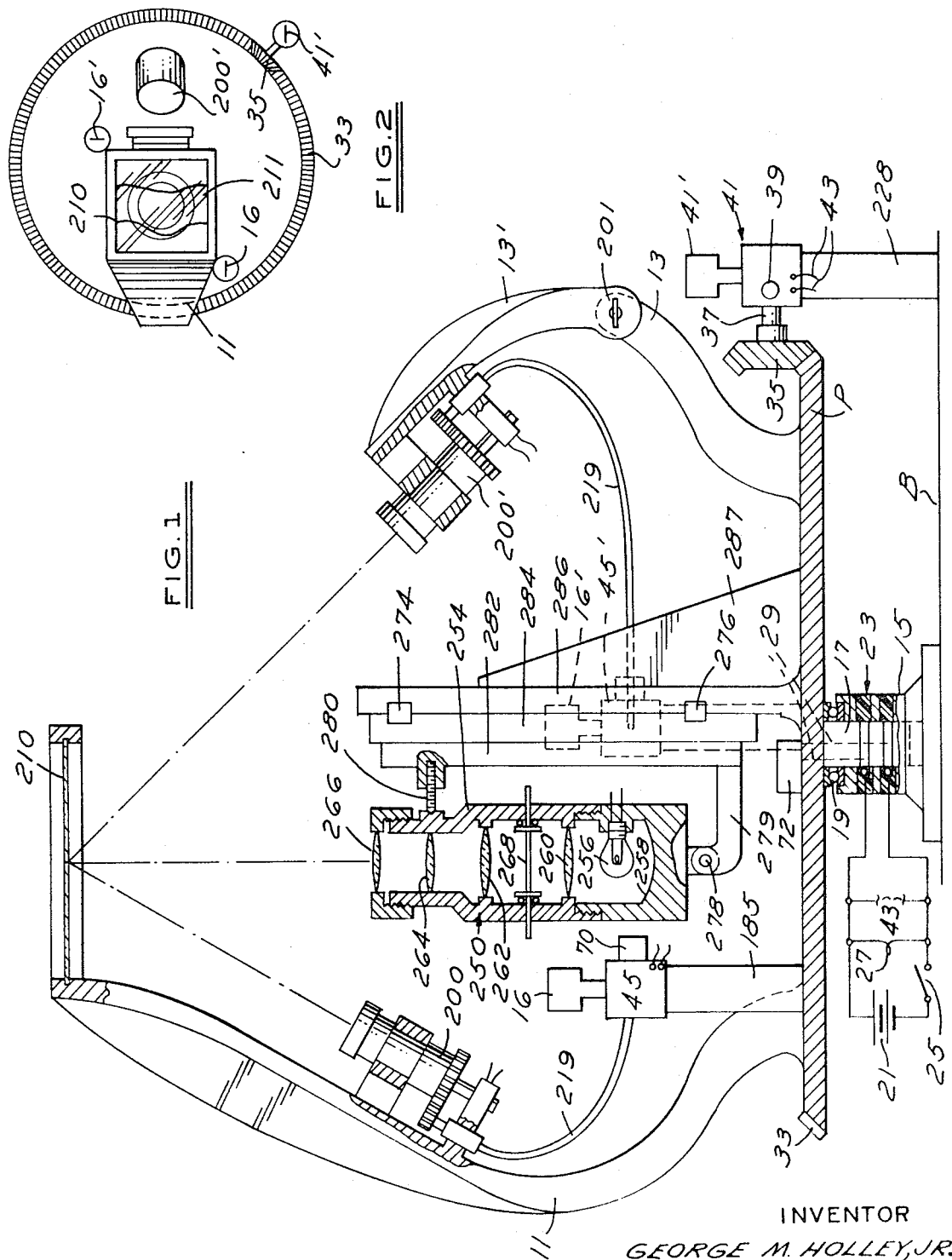

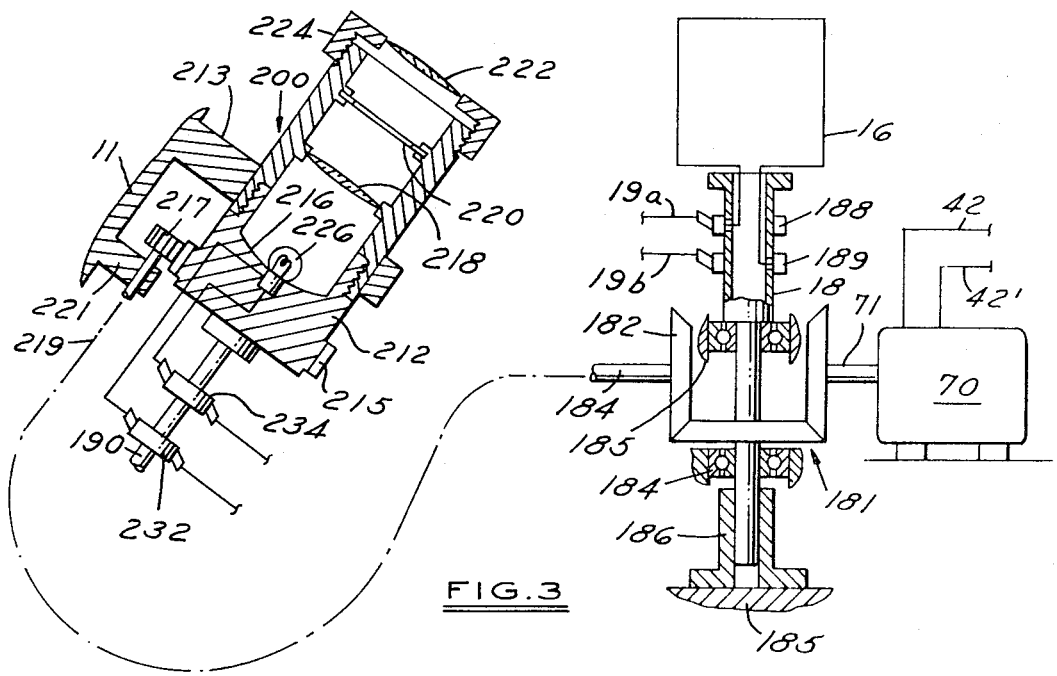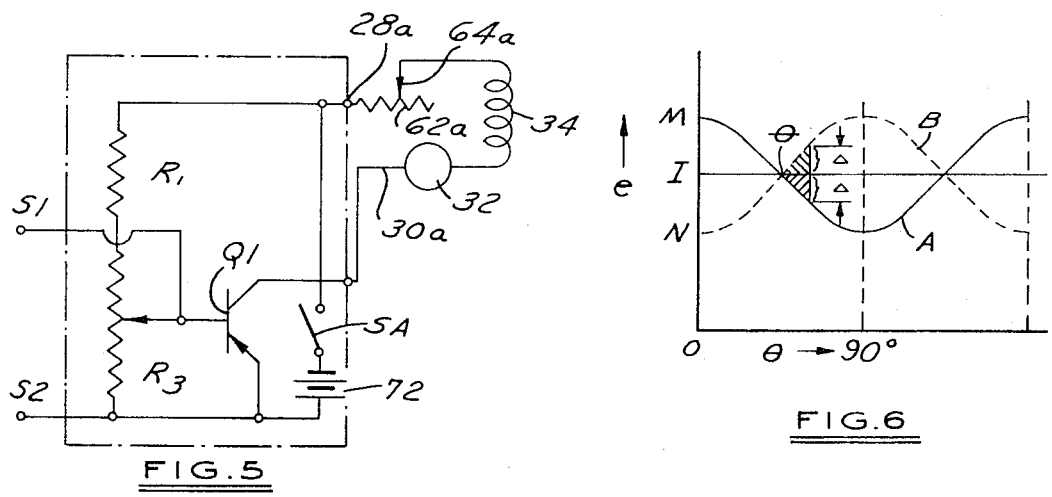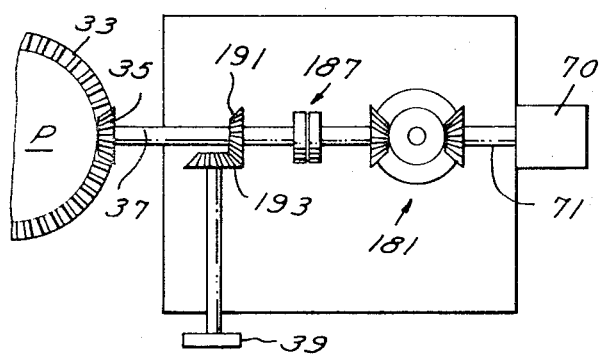

INVENTOR
GEORGE M. HOLLEY, JR.
BY
Burton & Parker
ATTORNEYS

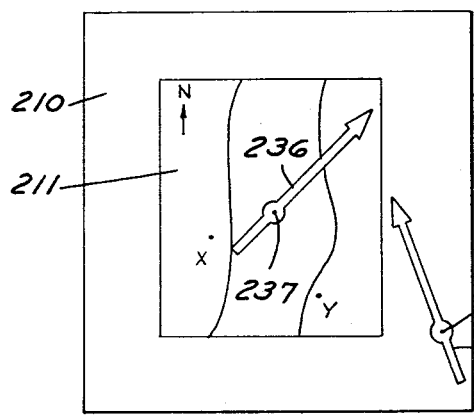
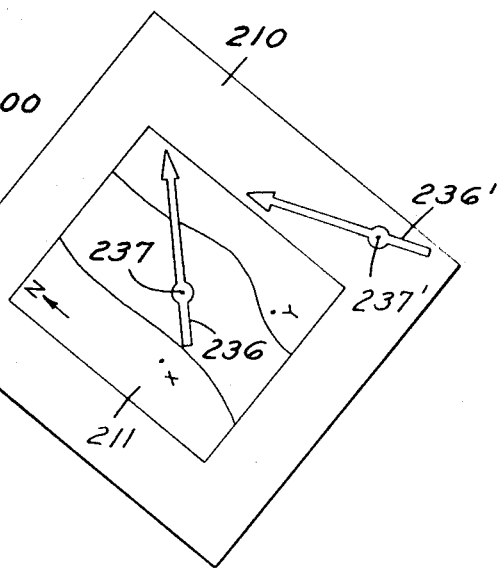
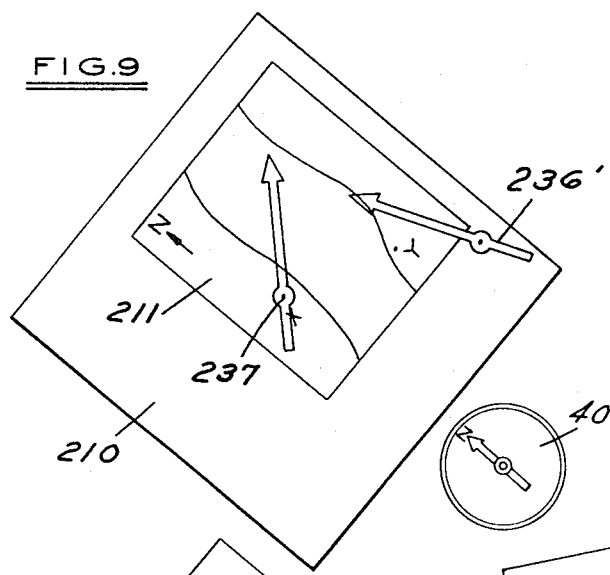
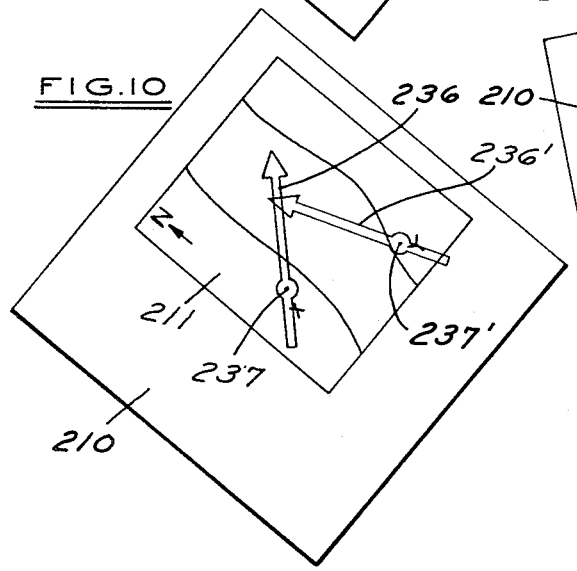
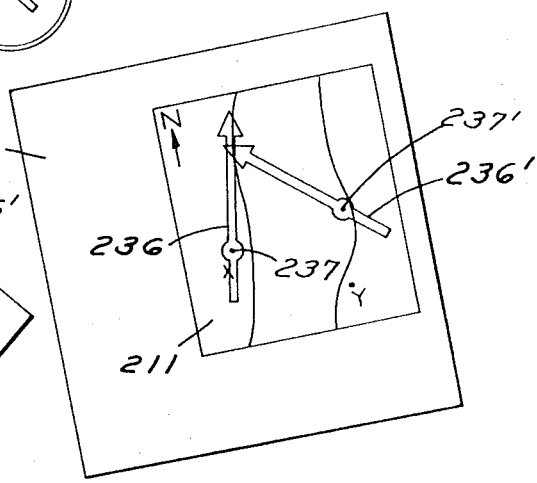

POSITION PLOTTER

BACKGROUND OF THE INVENTION

This invention relates to an automatic position plotter for use in navigating a craft, in particular a boat, and is a continuation-in-part of my U.S. Pat. application Ser. No. 730,204 filed May 17, 1968, now U.S. Pat. 3,524,187 and a continuation-in-part of my U.S. Pat. application Ser. No. 872,060 filed Oct. 29, 1969.

The invention has for its object to provide a relatively simple and inexpensive continuous or semicontinuous visual plot of vessel position on a chart of the waters being navigated and incorporates control principles disclosed in U.S. Pat. No. 3,419,866 and U.S. Pat. No. 3,524,187 the above-identified application. In such patents and pending application, I have disclosed relatively inexpensive radio-control apparatus for use in navigating pleasure boats. In the instant application I have modified such radio-control apparatus and combined it with a relatively inexpensive plotting system to provide a plotter that the pleasure boater can afford.

PRIOR ART

In the prior art, represented by such U.S. Pat. Nos. as 1,569,927; 2,080,511; 2,296,041; 2,307,029; 2,462,077; 2,718,061; 2,855,597; 3,059,233; 3,151,310; 3,184,740 and 3,249,942, to mention but a few, the plotting equipment is considerably more complicated and costly than the apparatus disclosed in my application and as a consequence would not be practical for the pleasure boater. Such prior art in recent years related to plotters for aircraft and more recently for use in high-speed aircraft and depends upon DME and omni radio beacons, computers and the like. Such sophisticated beacon equipment is not generally available in many areas frequented by pleasure boats and I contemplate the use of standard broadcast transmitters found all over the country and along its coasts, as well as any other suitable radio transmitter of known location in the area traversed by the vessel.

One of the problems of prior art position plotters of the type where a pair of RDF receivers control the position of intersecting plot arms or reticle projectors and the chart image swept by the plot arms is azimuthally oriented with a reference direction, arises from the complexity of the apparatus required to connect the RDF receivers to the plotting arms while allowing for either rotation of the chart or chart image. Another problem arises from complexity of positioning the plotting arms over the indicated location on the chart of the broadcast transmitters.

SUMMARY OF THE INVENTION

In general, the position plotter disclosed herein comprises a directional antenna connected to a radio receiver having an output circuit whose output characteristic varies in accordance with the direction of deviation of its receiver's antenna from a predetermined angular relation with a distant transmitter to which the receiver is tuned. A reversible motor responsive to a rise or fall in the output characteristic of the receiver is actuated in one direction or the other in accordance therewith and serves to maintain the predetermined angular relation of the antenna relative to the transmitter. At least two such ADF systems are utilized, with each connected to a respective one of a pair of rotatable pointer elements which are alignable with the locations of the transmitters shown on a navigation chart. The chart, or chart projector, the rotatable pointer elements, and the RDF antennae and the reversible motors associated therewith, are mounted on the rotatable platform to rotate therewith. Such mounting allows a simple connection of the motors both to the antennae and to the pointer means thereby overcoming one of the aforementioned problem of the prior art. In addition, the chart image which is projected on a screen may be readily shifted about the screen to align a pointer with a transmitter shown on the chart image.

DESCRIPTION OF THE DRAWINGS

FIG. 1 illustrates an automatic position plotter employing radio directional control systems of either FIGS. 4 or 12 for automatically and continuously plotting the position of a vessel carrying the plotter;

FIG. 2 is a plan view of the apparatus of FIG. 1;

FIG. 3 is a schematic view of a reticle projector and a directional antenna and associated reversible drive motor and the connection therebetween for use in the apparatus of FIG. 1;

FIG. 5 is a schematic electric circuit diagram of a form of amplifier employed in the control system of FIG. 4;

FIG. 6 is a graphical representation of signal variations with antenna attitude as developed in the control system of FIG. 4;

FIGS. 7-11 are forms of displays as seen by the vessel's navigator and illustrate adjustment of the displays obtained with the optical projecting apparatus of the automatic position plotter apparatus of FIG. 1;

FIG. 13 is a schematic plan view of the platform control unit with certain parts omitted for clarity.

FIG. 1 schematically illustrates the general arrangement of the position plotter. The device is mounted on any suitable portion of the vessel, such as a table or counter in the piloting area where the helmsman or navigator can easily adjust and observe it. The plotter includes a stationary base B on which a platform P is rotatably mounted. The platform includes a pair of upwardly extending arms 11 and 13 with the former carrying a translucent screen 210, such as a frosted-glass plate, which the navigator visually observes from above to note his position. If desired a suitable housing may enclose the apparatus exposing the screen 210 to view and providing access for adjustments hereinafter mentioned or implicit in the description of the apparatus.

Figure 4:
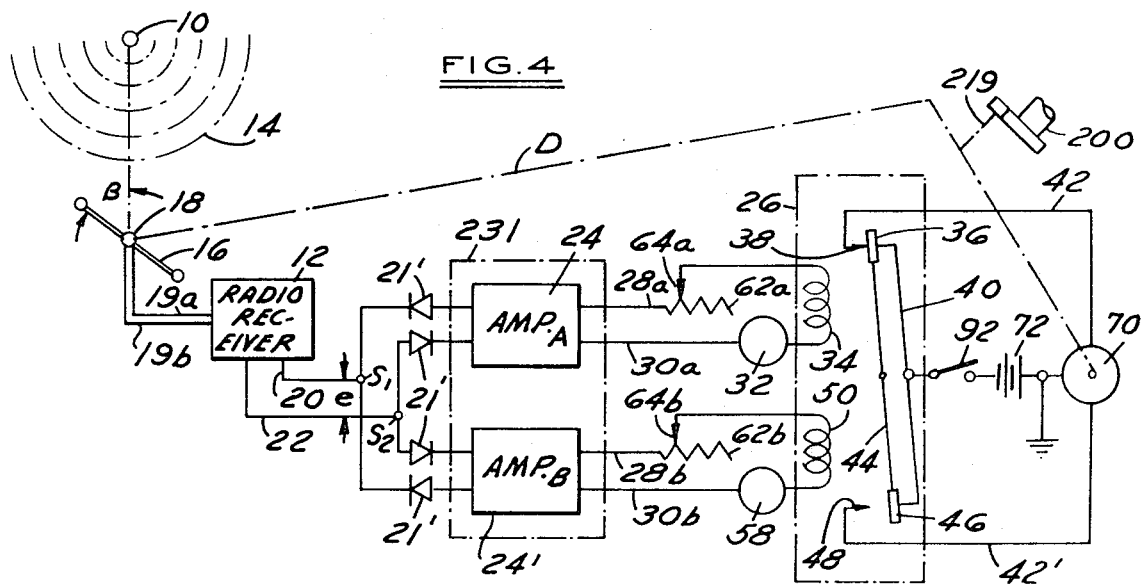
FIG. 4 is a schematic electric circuit diagram of one form of radio directional control system for use in the position plotter of FIG. 1.

The rotatable platform or table P may be supported in any suitable fashion as by a bearing assembly 15 mounted on the base and into which extends a hollow stub shaft 17. Antifriction bearings 19 support the platform at the upper end of the bearing assembly. A suitable source of electric power for the plotter may be furnished by a battery circuit which includes the vessel's battery 21, a slipring assembly 23 on the stub shaft and in the bearing assembly, an off/on switch 25, indicator lamp 27, conductors 29 running from the slipring assembly up through the stub shaft to a terminal box 72 on the platform from which the various components on the platform may derive their power.

The table P may be azimuthally rotated either automatically or manually and for this purpose is provided with a bevel gear periphery 33 meshing with a bevel pinion 35 on a position control shaft 37. The control shaft may be simply provided with a manual adjust knob 39, or may also be, as shown, part of an assembly 41 for automatically and continuously rotatably positioning the table to a preselected azimuth position such that a chart or chart image projected on screen 210 can be azimuthally oriented in a known direction, for example to the North. While the automatic platform positioning apparatus 41 is shown and described hereinafter as an automatic radio direction finder, and such is preferred for reasons of economy, any other suitable mechanism, such as gyro control, magnetic control or the like may be employed. Where automatic control of shaft 37 is omitted, the plotter is then of a semiautomatic nature as hereinafter discussed. The apparatus 37 may be connected in the battery circuit as by leads 43.

The plotting function is carried out by projecting on the screen 210 a chart image 211 (FIG. 2) from projector 250 of the area being sailed by the vessel, and superimposing on the chart image a pair of position reticle images, or as they may conveniently be termed, pointers, projected from a pair of projectors 200 and 200' mounted for rotation about their longitudinal axes on the arms 11 and 13 respectively. Each pointer projector rotates under the control of its own automatic radio direction finder, viz, projector 200 is controlled by the RDF unit 45 and projector 200' is controlled by the RDF unit 45'. Each RDF unit will maintain its pointer in predetermined orientation with respect to the transmitter to which the unit is tuned, during movements of the vessel. The pointers and chart image are positioned relative to each other such that the center of revolution of each pointer coincides with the chart location of transmitter to which the RDF unit for the pointer is tuned. With the chart image azimuthally oriented to a known direction, the point of intersection of the pointers gives the vessel's location on the chart image, and as the vessel moves the intersection of the pointers will move. As the vessel swings in one direction or the other, the platform, either automatically or manually, may be rotated in the opposite direction to maintain the chart image in proper azimuth with respect to a known direction, and thereby the intersection of the pointers will provide a plot of the vessel's position.

The chart projector 250 is best illustrated in FIG. 1 and comprises a housing 254 containing a lamp 256, a reflector 258, and a lens system such as lenses 260, 262, 264 and 266 for directing the light of lamp 256 through a positive photographic transparency, such as a slide 268, of the area being navigated to focus the image on screen 210. The slide, which may be a color transparency, is rotatably and removably supported in any convenient fashion in the housing 254. By having the slide rotatable in the projector, the chart image which may be of a square shape can be initially oriented with respect to the screen as desired.

The projector 250 is shown as movable on parallel guideways 274 and 276 for movement laterally of the screen 210 in one direction and is pivotable about pivot point 278, at the end of an arm 279 on a cradle 282, by adjustment screw 280 so as to move the projection of the chart across the screen at right angles to the guideway adjustment. The cradle 282 is mounted on a baseplate 284 which cooperates with the guideways. The guideways are carried by a pillar 286 which may be braced by a web 287. The chart image 211 projected on the screen 210 is considerably smaller than the screen, as is evident from FIGS. 7–11 for a reason hereafter apparent.

The projectors 200 and 200' are of identical construction and therefore a description of projector 200 shown in FIG. 3 will suffice. Such projector includes a housing 212 rotatably supported by a bracket portion 213 of the arm 11 with the housing having a ring gear 215 meshing with a drive pinion 217 on the end of a flexible shaft 219 carried by another bracket portion 221 of the arm 11. The flexible shaft 219 leads to the RDF unit 45 for controlling the rotated position of the projector 200 as hereafter explained. The projector also includes a rearwardly projecting stub shaft 190 carrying sliprings 232 and 234 which complete a circuit between the terminal box 72 and a lamp 226 in the housing 212. A reflector 216 directs the lamplight through lens 218, through a trace or pointer reticle 220 and a focusing lens 222 in an adjustable mount 224. The reticle may be an opaque plate having a narrow, diametrically extending, arrow-shaped slit with an enlarged opening adjacent the end opposite the arrow head so that the reticle will cast the image 236 from projector 200 and the image 236' from the projector 200', as shown in FIGS. 7–11.

The reticle image or pointer 236 of projector 200, while rotatable with the projector, is translationally fixed with its enlarged portion 237 located at the center of the screen 210. On the other hand, projector 200' is mounted for lateral translation of its reticle image or pointer 236' in right angular directions across the screen 210. To provide for this arm 13 has an upper arm portion 13' which is swivel connected at 201 to the lower portion of arm 13 whereby the pointer 236' may be translationally moved about the screen such as shown in FIGS. 7–11. The pinion gear of projector 200' corresponding to the gear 217 of projector 200 is connected by a flexible drive cable 219' to the RDF unit 45'.

The RDF units 45, 45' and 41 are of similar construction, except as specifically mentioned, so that a description of unit 45 will suffice in large measure for the others. Each includes a directional antenna, such as 16 for unit 45, 16' for unit 45' and 41' for unit 41. A reversible electric motor such as 70 in unit 45 rotates the antenna in opposite directions to maintain it at a given angular relation $\theta$ with the transmitter to which its receiver is tuned. Any suitable connection between the motor and antenna and position drive shaft may be provided. A representative form of such connection is shown in FIG. 3. The motor 70 receives direct current through leads 42 and 42' and drives a bevel gear assembly 181 having an antenna shaft 18 carrying the antenna 16, and a position control shaft 184 to which the flexible drive cable 219 is connected. The antenna leads 19a and 19b are connected to the antenna through sliprings 188 and 189 as shown, and the antenna shaft 18 may be supported as by bearings 182 and 184 and a bracket 186 mounted on enclosure 185 carried by platform P. The enclosure 185 and its counterpart 185' house the receivers for their respective antennae and the RDF control circuits for the motors. The enclosure 228 supports the antenna 41' and its associated motor, and houses its receiver and control circuits for the motor.

The RDF receiver and associated control circuits may be one of three types: that shown in my U.S. Pat. No. 3,419,866, that in my U.S. Pat. No. 3,524,187, or that in copending application Ser. No. 872,060 filed Oct. 29, 1969. The disclosures of such patent and the two pending applications are incorporated by reference in this application. For clarity of understanding portions of the pending applications most pertinent are included specifically herein.

FIG. 4 corresponds essentially to FIG. 1 of U.S. Pat. No. 3,524,187 and schematically shows a radio transmitter 10 whose location is indicated on the chart image projected on screen 210. A radio receiver 12 is connected by leads 19a–19b to the directional antenna 16, which is shown positioned at an angle $\theta$ relative to the direction of the wave front of the propagated wave 14 from the transmitter 10. The antenna induces a voltage appearing between the conductor leads 19a and 19b thereof connected to the input of the receiver 12 and supplies a voltage signal thereto that varies in amplitude in accordance with the rotated or angular position of the antenna relative to the transmitter. The receiver may be of a conventional superheterodyne variety for reception of amplitude modulated carrier waves and provides an amplified output voltage, as from the second detector section thereof, that rises and falls in accordance with the rotated or angular position of the antenna relative to the transmitter.

The output from the receiver is supplied over lines 20, 22, also labeled S1, S2, to the signal translating device 231, which, as illustrated herein, comprises a pair of amplifiers 24 and 24' of which the connections S1 and S2 are connected to the input terminals of amplifier 24' with the polarity reversed to or in the opposite manner to their connection to the input of amplifier 24. Diodes 21' may be provided in the inputs to the amplifiers for isolation of the amplifiers, which are oppositely driven to supply correspondingly inversely varying signal outputs from the output sections respectively thereof constituting separate channels A and B of the control system.

Each of the output channels A and B extends from the output of its corresponding amplifier supplied over conductors 28a, 28b and 30a, 30b through an adjustable potentiometer as 62a, 62b and a current indicating instrument as 32, 58, to a respective one of the two input sections of the comparator device 26. The comparator comprises a hunting relay having a pair of relay operating coils 34 and 50, which selectively actuate or control the positioning of a centrally pivotable armature element 44 having a pair of contacts 36 and 46 thereon for selective engagement with a corresponding one of a pair of stationary contacts 38 and 48. Contacts 38 and 48 are connected over conductors 42 and 42' to supply current over separate circuits from a source of direct current indicated at 72 and through switch 92 to the reversible motor 70, shown as a three-terminal motor. For a two-terminal motor intervening reversing means could be employed to reverse the connections for the direction of current through the field of the motor.

The energization and direction of rotation of motor 70 is thus controlled in accordance with the engagement of contacts 36, 38 or 46, 48, respectively, in response to the relative intensities of the signal currents in the relay coils 34 and 50. When the currents in the relay coils are equal, both sets of contacts 36, 38 and 46, 48 are open, the output of the comparator being effectively zero and the system is balanced or in equilibrium.

The amplifiers 24 and 24' may be of simple conventional form shown in the schematic circuit diagram of FIG. 5 comprising a simple PNP-single-stage transistor amplifier connected in a common emitter configuration. The resistor R1 and adjustable resistor R3 serve to adjust the bias on the base of transistor Q1 relative to its emitter connected to the positive side of the battery source 72. The collector is connected through the meter 32, relay coil 34 and potentiometer 62a, to the negative side of the supply source 72 through switch $S_4$. With $S_4$ closed, an increase in negative bias, by adjusting the setting of the variable arm of resistor R3 toward resistor R1, will increase the conductivity of the amplifier, resulting in increasing the level of the current flowing through the meter 32.

With a fixed setting of resistor R3, if the signal from the receiver is introduced at S1 and S2, then, as the signal current applied at S1 and S2 varies, so the current at 32 varies. If S1 is negative and S2 is positive, then an increase in the signal current increases the output current; if on the other hand, S1 is positive and S2 is negative, then an increase in the signal current decreases the current output proportionately.

In the embodiment illustrated, amplifier 24' is similar to amplifier A except that the input connections S1 and S2 thereto are reversed, as previously stated from the connections to amplifier A. In consequence, as the input signal across or between S1 and S2 increases, in a positive direction, for example, the output current of amplifier A will decrease, while that of amplifier B will increase. A decrease in signal current will increase the output of amplifier 24 and will decrease that from amplifier 24'. The amplifiers are thus inversely driven and operated, as in the manner of a push-pull amplifier, for example. Since it is the inversely varying relationships of the signals in the respective channels of the control system that is of importance, other connections, arrangements and compositions of single and/or compound stage amplifiers for accomplishing such inverse operation could be employed.

The manner in which the amplitude of the signal appearing between the terminals S1, S2 of the receiver varies with respect to the angular position of the antenna 16 relative to the transmitter 10 corresponds to that shown at B in FIG. 6, which is a chart of current versus the mechanical angular position or rotation of the antenna 16. FIG. 6 also represents by curve A the signal output from amplifier 24, while the dashed and dotted curve B represents the output from amplifier 24', when each amplifier is adjusted to produce the same amplification or output voltage swing therefrom. In both cases, the curves vary inversely with curve A varying from a maximum to a minimum condition and curve B from a minimum to a maximum condition as the antenna is rotated from 0° to 90° and integral multiples of 90° or of $\pi/2$ radians. The curves are of opposite phase relationship and execute a complete 360° cycle of electrical variation from a minimum to maximum and back to a minimum condition in 180° of mechanical rotation of the antenna.

It will be noted that any variation in antenna angle $\theta$ produces an equal but oppositely directed effect on the output signals from the amplifiers, resulting in a net difference between the output currents that is always equal to twice the change $\Delta$ produced in either amplifier alone. This consideration and the fact that the curves A and B converge at their intersection at point $\theta$ at an angle of 90° assures high system sensitivity even for slight deviations of antenna angle, and a faster attack and response than can otherwise be obtained from attempting to sense a change in the output of a single amplifier or in the receiver output signal alone.

With the antenna 16 positioned at a nonpull position intermediate its minimum and maximum output signal producing conditions, the condition corresponds to point $\theta$ of the curves of FIG. 6, representing an angle $\theta$ of 45° relative to the direction of the wave front or transmitted beam. As the vessel swings in one direction, the signal output will increase, and when it swings in the other direction the received signal current will decrease, as indicated by the curve B, for example. From the foregoing description it will be apparent that the motor 70 will therefore operate in one direction or the other depending upon the direction of swing of the vessel, causing a deviation of the antenna from its $\theta$ angle relative to the transmitter.

The output shaft 71 of motor 70 is connected to the antenna 16 to drive it as shown schematically by the dot-dash line D in FIG. 4 and the gearing arrangement in FIG. 3. When the vessel swings in one direction, the motor 70 will swing the antenna 16 in the opposite direction sufficiently to maintain the angle $\theta$ with respect to the transmitter.

FIG. 4 also schematically illustrates the connection of the motor 70 to the projector 200 by the flexible drive cable 219. As a consequence, not only will motor 70 maintain the antenna 16 at the angle $\theta$ relative to the transmitter, but will also rotatably maintain the reticle pointer image in a constant relationship with the transmitter. As the pointer image should point directly at the vessel from the transmitter, the angle $\theta$ is compensated by adjusting the mesh of the gears in the drive train for projector 200.

It will be understood that a separate RDF system for each of the pointer projectors 200 and 200' and for the platform position control 41, is provided as hereinabove described in connection with FIGS. 4–6. In the case of the platform position control unit 41, the output control shaft 37 of FIG. 1 corresponds to the output shaft 184 of FIG. 3, and instead of the flexible drive cable 219 of FIG. 3, the bevel gear 35 is mounted on the shaft to mesh with the gear 33.

In FIG. 13, which is a top view of the unit 41 with parts omitted for clarity, the motor 70 drives the bevel gear arrangement 181 as shown in FIG. 3, and between the spur gear 35 and the bevel gear arrangement 181 means are provided for allowing rotational adjustment of the platform independent of the motor 70 and antenna 16. If desired a similar arrangement may be incorporated in each of the units 45 and 45'. Such means includes a clutch 187 which may be an electric clutch of conventional design, to one-half of which the bevel gear arrangement 181 is connected, and to the other half the output shaft 37. Upon disengagement of the clutch the shaft 37 may be rotated independent of the motor 70 and antenna 16. A bevel gear 191 on shaft 37 meshes with bevel gear 193 on the shaft of knob 39 whereby manual rotation of the latter with the clutch 187 disengaged will rotatably adjust the platform P.

Figure 12:
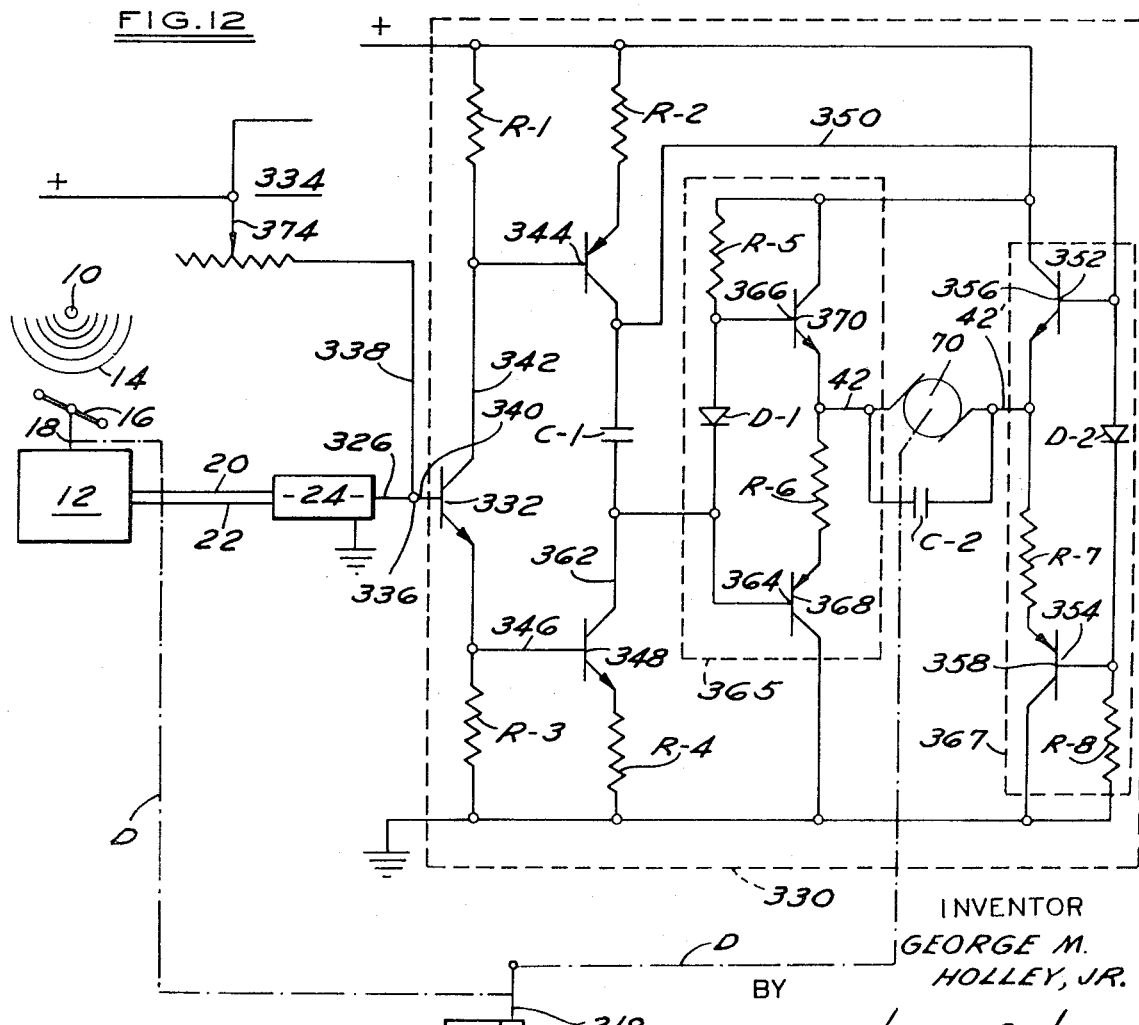
FIG. 12 is a schematic electric circuit diagram of another form of radio directional control system for use in the position plotter of FIG. 1.

FIG. 12 shows another form of RDF circuit for controlling operation of the reversible electric motors for the units 45, 45' or 41. This circuit allows a more compact form of control than that of FIG. 4 and for such reason is advantageous for use with the units 45 and 45' on the platform P. In this circuit parts correspondingly numbered in FIG. 4 are of the character and arrangement described with reference thereto.

The output circuit of the radio receiver 12 includes an amplifier 24 connected to the receiver as by leads 20 and 22. The output circuit of the receiver provides a voltage or current signal in leads 326 which increases or decreases in accordance with the angular position of the antenna 16 with respect to the transmitter 10.

The reversible motor 70 is a direct current motor whose direction of rotation is controlled by a motor-control network represented by that portion of FIG. 12 enclosed within the phantom line 330. The control network includes a signal responsive switch means in the form of transistor 332 which causes the network to render the motor 70 inoperative, or to operate it in one direction or the other depending on the signal level at the input to the switch means.

The input signal, herein referred to as the control signal, to the signal responsive switch means 332 of the motor-control network, comprises a resultant of the combination of the output signal from the radio receiver and the output signal from a source of selectively variable voltage or current, such as potentiometer 334. These two signals are combined in mixer means in the form shown comprising simply the junction 336 of the lead 326 and the lead 338 from the potentiometer 334, and the resultant signal is delivered by lead 340 to the base of the transistor 332. At a given level of the control signal the motor-control network will render the motor inoperative. As a consequence, when initially adjusting the system, and with the directional antenna 16 turned to say 30° from its null position, the potentiometer 334 is adjusted to provide a level of control signal at the transistor 332 which will render motor 70 inoperative. Thereafter, as the antenna swings one way or the other from its initial angular position relative to the transmitter, the control signal level will rise and fall accordingly, a rise causing the control network 330 to operate the motor 70 in one direction and a fall to operate it in the opposite direction.

The operation of the motor-control network 330 may be appreciated from an analysis of what occurs upon rotation of the antenna 16 from its initial angular position. If the antenna rotates relative to the broadcasting station so as to increase the variable signal in lead 326, then transistor 332 is activated to be less resistant causing an increase in current from its collector to its emitter which results in a decrease in the level of the voltage in line 342 leading to the base of transistor 344, and an increase in the voltage in line 346 leading to the base of transistor 348. The decrease in voltage in line 342 causes an increase in the voltage in line 350 causing an increase at the bases 352 and 354 of transistors 356 and 358. The increase at 352 and 354 causes an increase in voltage in line 42' to the motor 70. The increase in voltage to line 346 leading to the base of transistor 348 causes a decrease in line 362 leading to the bases 364 and 366 of transistors 368 and 370. The decrease in voltage to the bases of transistors 368 and 370 causes a decrease in voltage in line 42 leading to motor 70. Since as a result of an increase in signal at 326 the voltage across the motor 70 has become unbalanced and the voltage at 42' is greater than at 42 the motor turns to drive the antenna relative to the transmitter and will continue to turn in such direction until the voltage to the base of transistor 332 has decreased to where equilibrium at 42 and 42' is obtained.

If the level of the amplified signal delivered by the receiver output circuit at 326 should decrease, then the reaction in the motor-control network is just the opposite and an increase in voltage arises at 42 and a decrease at 42' causing the motor 70 to turn in the opposite direction.

It will be observed from a consideration of the drawing that a pair of complementary transistor control circuits are connected to opposite sides of the motor 70 and operate in push-pull relation, the one being enclosed in the phantom box 365 and the other by the phantom box 367.

The mechanical connection between the motor 70 and the antenna 16 is represented by the dot-dash line D and to a reticle image projector 200 at 219. In addition to the transistors and other elements of the control system heretofore mentioned there are two diodes D-1 and D-2, two capacitors C-1 and C-2, and either resistors R-1 through R-8. It is believed that the purpose of the diodes and capacitors and resistors will be readily apparent to those skilled in the art and the description of their function is therefore omitted.

Reference to FIGS. 7-11 will illustrate operation of the plotter. Each of their views shows the screen 210 as it might be viewed by the navigator. In FIG. 7 the chart projector 250 and pointer projectors 200 and 200' have been turned on as well as the RDF units 45, 45' and 41, and the units 45 and 45' turned to a pair of broadcast transmitters at some distance to the vessel but whose locations are indicated at points X and Y respectively on the chart image 211. The RDF unit 41 may be turned to either of these transmitters or to a third transmitter. When speaking of tuning an RDF unit to a transmitter I intend not only a frequency tuning but also a positioning of the antenna of the respective units to an angular position with respect to the transmitter so the control functions previously described can be carried out.

Next the platform P is rotated by use of knob 39 while clutch 187 (FIG. 13) is disengaged to aximuthally orient the plotter, and in turn the chart image, toward a known direction, such as north, FIG. 8 shows the result of such orientation wherein the north direction of the chart image lies parallel to north as indicated by the vessel's compass 400. Thereafter the clutch 187 is reengaged so that the chart image will be maintained automatically in a north orientation despite swinging of the vessel's heading.

The chart image 211 is next shifted to locate the enlargement 237 of pointer 236 directly over the charted location of transmitter X. The result of this is shown in FIG. 9. Such translation of the chart image is accomplished by adjusting screw 280 and shifting the projector cradle 282 along its guideways. Next the reticle projector 200' is swung to locate the enlargement 237' of pointer 236' directly over the charted location of transmitter Y as shown in FIG. 10. At the intersection of the pointers the location of the vessel is shown on the chart image 211 in FIG. 10.

As the heading of the vessel changes the platform P will rotate to maintain an accurate picture of the position plot, and of course the intersection of the pointers will change as the vessel moves along its course to render a continuous plot of position. Should it be desired to eliminate the automatic control of the platform P and operate the azimuth positioning of the table manually, the orientation of the chart image will give a false position plot whenever the vessel's heading changes as shown in FIG. 11 where the course has changed Easterly from FIG. 10. A simple repositioning of the platform to realign the chart image 211 to the north will immediately give a proper plot as shown in FIG. 10.

While I have shown the chart image projector 250 and the pointer projector 200' as being adjustable to align the pointers and chart image transmitter locations, it is to be understood that the plotter will function equally well if instead of the chart image projector 250 being adjustable the pointer projector 200 is made adjustable similar to projector 200'. If this modification is made, the chart image 211 and screen 210 may be of substantially the same size.

What is claimed is:

1. A position plotter for use on a vessel, comprising in combination: a platform azimuthally rotatable relative to the vessel to a known reference direction, means on the platform for displaying a navigation chart for rotation with the platform, a pair of independently rotatable pointer means mounted on the platform for movement therewith and providing a pair of pointers for sweeping the chart display, said pointer means and chart display being relatively shiftable to align the pointers with a pair of radio transmitter locations on the chart display, a pair of automatic radio direction finders mounted on the platform for tuning to the pair of transmitters whose chart locations are aligned with the pointer means, and each direction finder connected to one of the pointer means to rotatably drive the same in accordance with the controlled movement of the antenna of each direction finder.

2. The invention defined by claim 1 characterized in that the means for displaying the navigation chart comprises a chart image projector and a screen on which the chart image is projected and said pointer means comprises a pair of reticle image projectors for projecting pointer images on the screen superimposing a chart image projected by the chart projector.

3. The invention defined by claim 2 characterized in that each radio direction finder includes an antenna and a radio and a reversible motor connected to the antenna which is responsive to rise and fall of signal output of the receiver to rotate the antenna to maintain a predetermined angular relation thereof to a charted transmitter to which the receiver is tuned, and each reticle projector is connected to the reversible motor of its respective radio direction finder to be rotated in accordance with the angular relation of the directional antenna and the transmitter.

4. The invention defined by claim 1 characterized in that there is a reversible motor drivingly connected to the platform to rotate it and an automatic radio direction finder connected to the motor to operate it in one direction or the other in response to control movements of the antenna of the direction finder, and clutch means in the drive between such motor and the platform whereby the platform may be rotatably oriented independent of the motor and thereafter the clutch engaged to rotate the platform under control of the automatic radio direction finder to maintain the azimuthal reference of the platform.

5. The invention defined in claim 1 characterized in that control means are connected to said platform for maintaining it in determined azimuthal position independent of vessel heading.

6. A position plotter comprising, in combination: a navigation chart, a pair of independently rotatable pointer means providing a pair of pointers for sweeping the chart and with the pointer means and chart being relatively shiftable to align the pointers with a pair of distant radio transmitter locations designated on the chart, a pair of automatic radio direction finders each having a directional antenna, rotatable platform means for supporting the antennae of the automatic direction finders, each of said automatic direction finders including motor means mounted on the platform means and connected to its respective antenna for rotatably positioning and holding the antenna in fixed rotated relation with one of the pair of distant radio transmitters designated on the chart to which the respective direction finder is tuned, control means connected to said platform means for rotatably positioning the platform means in a predetermined azimuthal position, and each of said pointer means responsive to rotation of one of said directional antennae to cause sweeping of the pointer means over the chart with the intersection thereof indicating the position plot on the chart when said platform means is at said predetermined azimuthal position.

7. The invention defined in claim 6 characterized in that said control means includes motor means for maintaining the platform means in a predetermined azimuthal position.

* * * * *